United States Patent
Adams, Jr. et al.

(10) Patent No.: US 7,830,430 B2
(45) Date of Patent: Nov. 9, 2010

(54) INTERPOLATION OF PANCHROMATIC AND COLOR PIXELS

(75) Inventors: James E. Adams, Jr., Rochester, NY (US); John F. Hamilton, Jr., Rochester, NY (US); Michele O'Brien, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1323 days.

(21) Appl. No.: 11/341,206

(22) Filed: Jan. 27, 2006

(65) Prior Publication Data

US 2007/0024934 A1  Feb. 1, 2007

(51) Int. Cl.
*H04N 9/083* (2006.01)
*H04N 3/14* (2006.01)
*H04N 5/335* (2006.01)
*H04N 9/04* (2006.01)

(52) U.S. Cl. .................. 348/277; 348/276; 348/272; 348/280; 348/281

(58) Field of Classification Search ............. 348/276, 348/277
See application file for complete search history.

(56) References Cited

U.S. PATENT DOCUMENTS

| 5,323,233 | A | * | 6/1994 | Yamagami et al. | ......... 348/277 |
| 5,374,956 | A | * | 12/1994 | D'Luna | ......... 348/275 |
| 5,506,619 | A | * | 4/1996 | Adams et al. | ......... 348/272 |
| 5,596,367 | A | * | 1/1997 | Hamilton et al. | ......... 348/272 |
| 5,629,734 | A | * | 5/1997 | Hamilton et al. | ......... 348/222.1 |
| 6,529,239 | B1 | | 3/2003 | Dyck et al. | |
| 6,714,243 | B1 | * | 3/2004 | Mathur et al. | ......... 348/273 |
| 6,757,012 | B1 | | 6/2004 | Hubina et al. | |
| 7,577,315 | B2 | * | 8/2009 | Uvarov et al. | ......... 382/300 |
| 2003/0210332 | A1 | | 11/2003 | Frame | |

FOREIGN PATENT DOCUMENTS

| EP | 0472299 | 2/1992 |
| EP | 1035729 | 9/2000 |
| EP | 1411471 | 4/2004 |
| WO | 2007/015765 | 2/2007 |

\* cited by examiner

*Primary Examiner*—Sinh Tran
*Assistant Examiner*—Jason A Flohre
(74) *Attorney, Agent, or Firm*—Raymond L. Owens

(57) ABSTRACT

A method for forming a final digital color image, includes: capturing an image using an image sensor having panchromatic pixels and color pixels corresponding to at least two color photoresponses; providing from the captured image a digital high resolution panchromatic image and a digital high resolution color differences image; and using the digital high resolution panchromatic image and the digital high resolution color differences image to produce the final digital high resolution full color image.

16 Claims, 16 Drawing Sheets

|  |  |  |  |  |  |
|---|---|---|---|---|---|
| $G_8$ | P | P | $B_{16}$ | P | P |
| $R_7$ | P | P | $G_{15}$ | P | P |
| $G_6$ | P | P | $B_{14}$ | P | P |
| $R_5$ | P | P | $G_{13}$ | P | P |
| $G_4$ | P | P | $B_{12}$ | P | P |
| $R_3$ | P | P | $G_{11}$ | P | P |
| $G_2$ | P | P | $B_{10}$ | P | P |
| $R_1$ | P | P | $G_9$ | P | P |

*FIG. 5*

|  |  |  |  |  |  |
|---|---|---|---|---|---|
| G | P | P | B | P | P |
| R | P | P | G | P | P |

*FIG. 4*

| $P_1$ | $P_2$ | $P_3$ | $P_4$ | $P_5$ | $P_6$ |
|---|---|---|---|---|---|
| $P_7$ | $P_8$ | $P_9$ | $P_{10}$ | $P_{11}$ | $P_{12}$ |
| $G_{13}$ | $B_{14}$ | $G_{15}$ | $B_{16}$ | $G_{17}$ | $B_{18}$ |
| $P_{19}$ | $P_{20}$ | $P_{21}$ | $P_{22}$ | $P_{23}$ | $P_{24}$ |
| $P_{25}$ | $P_{26}$ | $P_{27}$ | $P_{28}$ | $P_{29}$ | $P_{30}$ |

*FIG. 7*

| $R_1'$ | $G_2'$ |
|---|---|
| $G_3'$ | $B_4'$ |

| G | P | P | B | P | P |
|---|---|---|---|---|---|
| G | P | P | B | P | P |
| G | P | P | B | P | P |
| R | P | P | G | P | P |
| R | P | P | G | P | P |
| R | P | P | G | P | P |

*FIG. 11*

| $X_1$ | $X_2$ | $X_3$ | $X_4$ |
|---|---|---|---|

*FIG. 10*

|     |     |     |     |     |
|-----|-----|-----|-----|-----|
| P$_{15}$ | P$_{25}$ | G$_{35}$ | P$_{45}$ | P$_{55}$ |
| P$_{14}$ | P$_{24}$ | B$_{34}$ | P$_{44}$ | P$_{54}$ |
| P$_{13}$ | P$_{23}$ | B$_{33}$ | P$_{43}$ | P$_{53}$ |
| P$_{12}$ | P$_{22}$ | B$_{32}$ | P$_{42}$ | P$_{52}$ |
| P$_{11}$ | P$_{21}$ | G$_{31}$ | P$_{41}$ | P$_{51}$ |

*FIG. 13*

|     |     |     |     |     |     |
|-----|-----|-----|-----|-----|-----|
| G$_{16}$ | P | P | B$_{26}$ | P | P |
| G$_{15}$ | P | P | B$_{25}$ | P | P |
| G$_{14}$ | P | P | B$_{24}$ | P | P |
| R$_{13}$ | P | P | G$_{23}$ | P | P |
| R$_{12}$ | P | P | G$_{22}$ | P | P |
| R$_{11}$ | P | P | G$_{21}$ | P | P |

*FIG. 12*

| G | P | G | P | B | P | B | P |
|---|---|---|---|---|---|---|---|
| G | P | G | P | B | P | B | P |
| G | P | G | P | B | P | B | P |
| G | P | G | P | B | P | B | P |
| R | P | R | P | G | P | G | P |
| R | P | R | P | G | P | G | P |
| R | P | R | P | G | P | G | P |
| R | P | R | P | G | P | G | P |

*FIG. 14*

| $R_{11}$ | P | $R_{21}$ | P | $G_{31}$ | P | $G_{41}$ | P |
| --- | --- | --- | --- | --- | --- | --- | --- |
| $R_{12}$ | P | $R_{22}$ | P | $G_{32}$ | P | $G_{42}$ | P |
| $R_{13}$ | P | $R_{23}$ | P | $G_{33}$ | P | $G_{43}$ | P |
| $R_{14}$ | P | $R_{24}$ | P | $G_{34}$ | P | $G_{44}$ | P |
| $G_{15}$ | P | $G_{25}$ | P | $B_{35}$ | P | $B_{45}$ | P |
| $G_{16}$ | P | $G_{26}$ | P | $B_{36}$ | P | $B_{46}$ | P |
| $G_{17}$ | P | $G_{27}$ | P | $B_{37}$ | P | $B_{47}$ | P |
| $G_{18}$ | P | $G_{28}$ | P | $B_{38}$ | P | $B_{48}$ | P |

*FIG. 15*

| $P_{10}$ | $P_{11}$ | $P_{12}$ | $P_{13}$ | $P_{14}$ | $P_{15}$ | $P_{16}$ | $P_{176}$ |
|---|---|---|---|---|---|---|---|
| $G_{20}$ | $G_{21}$ | $R_{22}$ | $R_{23}$ | $R_{24}$ | $R_{25}$ | $G_{26}$ | $G_{27}$ |
| $P_{30}$ | $P_{31}$ | $P_{32}$ | $P_{33}$ | $P_{34}$ | $P_{35}$ | $P_{36}$ | $P_{37}$ |
| $B_{40}$ | $B_{41}$ | $G_{42}$ | $G_{43}$ | $G_{44}$ | $G_{45}$ | $B_{46}$ | $B_{47}$ |

*FIG. 16B*

| $P_{10}$ | $P_{11}$ | $P_{12}$ | $P_{13}$ | $P_{14}$ | $P_{15}$ | $P_{16}$ | $P_{17}$ |
|---|---|---|---|---|---|---|---|
| $G_{20}$ | $G_{21}$ | $B_{22}$ | $B_{23}$ | $B_{24}$ | $B_{25}$ | $G_{26}$ | $G_{27}$ |
| $P_{30}$ | $P_{31}$ | $P_{32}$ | $P_{33}$ | $P_{34}$ | $P_{35}$ | $P_{36}$ | $P_{37}$ |
| $R_{40}$ | $R_{41}$ | $G_{42}$ | $G_{43}$ | $G_{44}$ | $G_{45}$ | $R_{46}$ | $R_{47}$ |

*FIG. 16A*

| $P_{10}$ | $P_{11}$ | $P_{12}$ | $P_{13}$ | $P_{14}$ | $P_{15}$ | $P_{16}$ | $P_{17}$ |
|---|---|---|---|---|---|---|---|
| $R_{20}$ | $R_{21}$ | $G_{22}$ | $G_{23}$ | $G_{24}$ | $G_{25}$ | $R_{26}$ | $R_{27}$ |
| $P_{30}$ | $P_{31}$ | $P_{32}$ | $P_{33}$ | $P_{34}$ | $P_{35}$ | $P_{36}$ | $P_{37}$ |
| $G_{40}$ | $G_{41}$ | $B_{42}$ | $B_{43}$ | $B_{44}$ | $B_{45}$ | $G_{46}$ | $G_{47}$ |

*FIG. 16D*

| $P_{10}$ | $P_{11}$ | $P_{12}$ | $P_{13}$ | $P_{14}$ | $P_{15}$ | $P_{16}$ | $P_{17}$ |
|---|---|---|---|---|---|---|---|
| $B_{20}$ | $B_{21}$ | $G_{22}$ | $G_{23}$ | $G_{24}$ | $G_{25}$ | $B_{26}$ | $B_{27}$ |
| $P_{30}$ | $P_{31}$ | $P_{32}$ | $P_{33}$ | $P_{34}$ | $P_{35}$ | $P_{36}$ | $P_{37}$ |
| $G_{40}$ | $G_{41}$ | $R_{42}$ | $R_{43}$ | $R_{44}$ | $R_{45}$ | $G_{46}$ | $G_{47}$ |

*FIG. 16C*

| P | P$_{20}$ | P | P$_{40}$ | P | P$_{60}$ | P | P$_{80}$ |
|---|---|---|---|---|---|---|---|
| P | P$_{21}$ | P | P$_{41}$ | P | P$_{61}$ | P | P$_{81}$ |
| P | P$_{22}$ | P | P$_{42}$ | P | P$_{62}$ | P | P$_{82}$ |
| P | P$_{23}$ | P | P$_{43}$ | P | P$_{63}$ | P | P$_{83}$ |
| P | P$_{24}$ | P | P$_{44}$ | P | P$_{64}$ | P | P$_{84}$ |
| P | P$_{25}$ | P | P$_{45}$ | P | P$_{65}$ | P | P$_{85}$ |
| P | P$_{26}$ | P | P$_{46}$ | P | P$_{66}$ | P | P$_{86}$ |
| P | P$_{27}$ | P | P$_{47}$ | P | P$_{67}$ | P | P$_{87}$ |

*FIG. 17*

| $X_1$ | $X_2$ | $X_3$ | $X_4$ | $X_5$ |
|---|---|---|---|---|

*FIG. 18*

| P | P | P | P | P | P | P | P |
|---|---|---|---|---|---|---|---|
| P | G | P | G | P | B | P | B |
| P | P | P | P | P | P | P | P |
| P | G | P | G | P | B | P | B |
| P | P | P | P | P | P | P | P |
| P | R | P | R | P | G | P | G |
| P | P | P | P | P | P | P | P |
| P | R | P | R | P | G | P | G |

*FIG. 19*

| P | P | P | P | P | P | P | P |
|---|---|---|---|---|---|---|---|
| P | $G_{14}$ | P | $G_{24}$ | P | $B_{34}$ | P | $B_{44}$ |
| P | P | P | P | P | P | P | P |
| P | $G_{13}$ | P | $G_{23}$ | P | $B_{33}$ | P | $B_{43}$ |
| P | P | P | P | P | P | P | P |
| P | $R_{12}$ | P | $R_{22}$ | P | $G_{32}$ | P | $G_{42}$ |
| P | P | P | P | P | P | P | P |
| P | $R_{11}$ | P | $R_{21}$ | P | $G_{31}$ | P | $G_{41}$ |

*FIG. 20*

| $P_{11}$ | $P_{12}$ | $P_{13}$ |
|---|---|---|
| $P_{21}$ | $X_{22}$ | $P_{23}$ |
| $P_{31}$ | $P_{32}$ | $P_{33}$ |

| P | P | P | P | P | P | P | P |
|---|---|---|---|---|---|---|---|
| P | $P_{14}$ | P | $P_{24}$ | P | $P_{34}$ | P | $P_{44}$ |
| P | P | P | P | P | P | P | P |
| P | $P_{13}$ | P | $P_{23}$ | P | $P_{33}$ | P | $P_{43}$ |
| P | P | P | P | P | P | P | P |
| P | $P_{12}$ | P | $P_{22}$ | P | $P_{32}$ | P | $P_{42}$ |
| P | P | P | P | P | P | P | P |
| P | $P_{11}$ | P | $P_{21}$ | P | $P_{31}$ | P | $P_{41}$ |

INTERPOLATION OF PANCHROMATIC AND COLOR PIXELS

CROSS REFERENCE TO RELATED APPLICATIONS

Reference is made to commonly-assigned U.S. patent application Ser. No. 11/191,729, filed Jul. 28, 2005, entitled "Image Sensor With Improved Light Sensitivity" by John T. Compton et al, and U.S. patent application Ser. No. 11/341, 210, filed Jan. 27, 2006, entitled "Image Sensor With Improved Light Sensitivity" by Takayuki Kijima et al the disclosure of which is incorporated herein.

FIELD OF THE INVENTION

The invention relates generally to the field of digital image processing operations that are particularly suitable for use in all sorts of imaging devices.

BACKGROUND OF THE INVENTION

Video cameras and digital still cameras generally employ a single image sensor with a color filter array to record a scene. This approach begins with a sparsely populated single-channel image in which the color information is encoded by the color filter array pattern. Subsequent interpolation of the neighboring pixel values permits the reconstruction of a complete three-channel, full-color image. One example of this process can be found in U.S. Pat. No. 5,506,619, Hamilton et al.

Under low-light imaging situations, it is advantageous to have one or more of the pixels in the color filter array unfiltered, i.e. white or panchromatic in spectral sensitivity. These panchromatic pixels have the maximum light sensitivity capability of the capture system. Employing panchromatic pixels represents a tradeoff in the capture system between light sensitivity and color spatial resolution. To this end, many four-color color filter array systems have been described. U.S. Pat. No. 6,529,239, Dyck et al. teaches a green-cyan-yellow-white pattern that is arranged as a 2×2 block that is tessellated over the surface of the sensor. U.S. Pat. No. 6,757,012, Hubina et al. discloses both a red-green-blue-white pattern and a yellow-cyan-magenta-white pattern. In both cases the colors are arranged in a 2×2 block that is tessellated over the surface of the imager. The difficulty with such systems is that only one-quarter of the pixels in the color filter array have maximum light sensitivity, thus limiting the overall low-light performance of the capture device.

To address the need of having more pixels with maximum light sensitivity in the color filter array, U.S. Patent Application Publication 2003/0210332, Frame, describes a pixel array with most of the pixels being unfiltered. Relatively few pixels are devoted to capturing color information from the scene producing a system with low color spatial resolution capability. Additionally, Frame teaches using simple linear interpolation techniques that are not responsive to, or protective of high frequency color spatial details in the image.

What is needed is color filter array with an appropriate composition of panchromatic and color pixels in order to provide both improved low-light sensitivity and improved color spatial resolution fidelity. Additionally, a method is needed to process the image data produced by such a color filter array in order to preserve and enhance panchromatic and color spatial details and ultimate produce a full-color, full-resolution image.

SUMMARY OF THE INVENTION

The present invention provides a method for forming a final digital color image, comprising:

(a) capturing an image using an image sensor having panchromatic pixels and color pixels corresponding to at least two color photoresponses;

(b) providing from the captured image a digital high resolution panchromatic image and a digital high resolution color differences image; and (c) using the digital high resolution panchromatic image and the digital high resolution color differences image to produce the final digital high resolution full color image.

It is a feature of the present invention that images can be captured under low-light capture with improved image fidelity.

It is another feature of the present invention that image fidelity is improved through the use of adaptive image processing strategies.

BRIEF DESCRIPTION OF THE DRAWINGS

FIG. 4 is a region of pixels in block 200 in FIG. 2;

FIG. 5 is a region of pixels used in block 202 in FIG. 2;

FIG. 6 is a region of pixels produced in block 202 in FIG. 2;

FIG. 7 is a region of pixels used in block 204 in FIG. 2;

FIG. 8 is a region of pixels produced in block 204 in FIG. 2;

FIG. 9 is a region of pixels produced in block 206 in FIG. 2;

FIG. 10 is a region of pixels produced in block 210 in FIG. 2;

FIG. 11 is a region of pixels produced in block 200 in FIG. 2 of an alternate embodiment;

FIG. 12 is a region of pixels used in block 202 in FIG. 2 of an alternate embodiment;

FIG. 13 is a region of pixels used in block 204 in FIG. 2 of an alternate embodiment;

FIG. 14 is a region of pixels produced in block 200 in FIG. 2 of an alternate embodiment;

FIG. 15 is a region of pixels use in block 202 in FIG. 2 of an alternate embodiment;

FIG. 16 is a region of pixels used in block 204 in FIG. 2 of an alternate embodiment;

FIG. 17 is a region of pixels produced in block 204 in FIG. 2 of an alternate embodiment;

FIG. 18 is a region of pixels in block 210 in FIG. 2 of an alternate embodiment;

FIG. 19 is a region of pixels produce in block 200 in FIG. 2 of an alternate embodiment;

FIG. 20 is a region of pixels used in block 202 in FIG. 2 of an alternate embodiment;

FIG. 21 is a region of pixels used in block 204 in FIG. 2 of an alternate embodiment; and FIG. 22 is a region of pixels produced in block 204 in FIG. 2 of an alternate embodiment.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
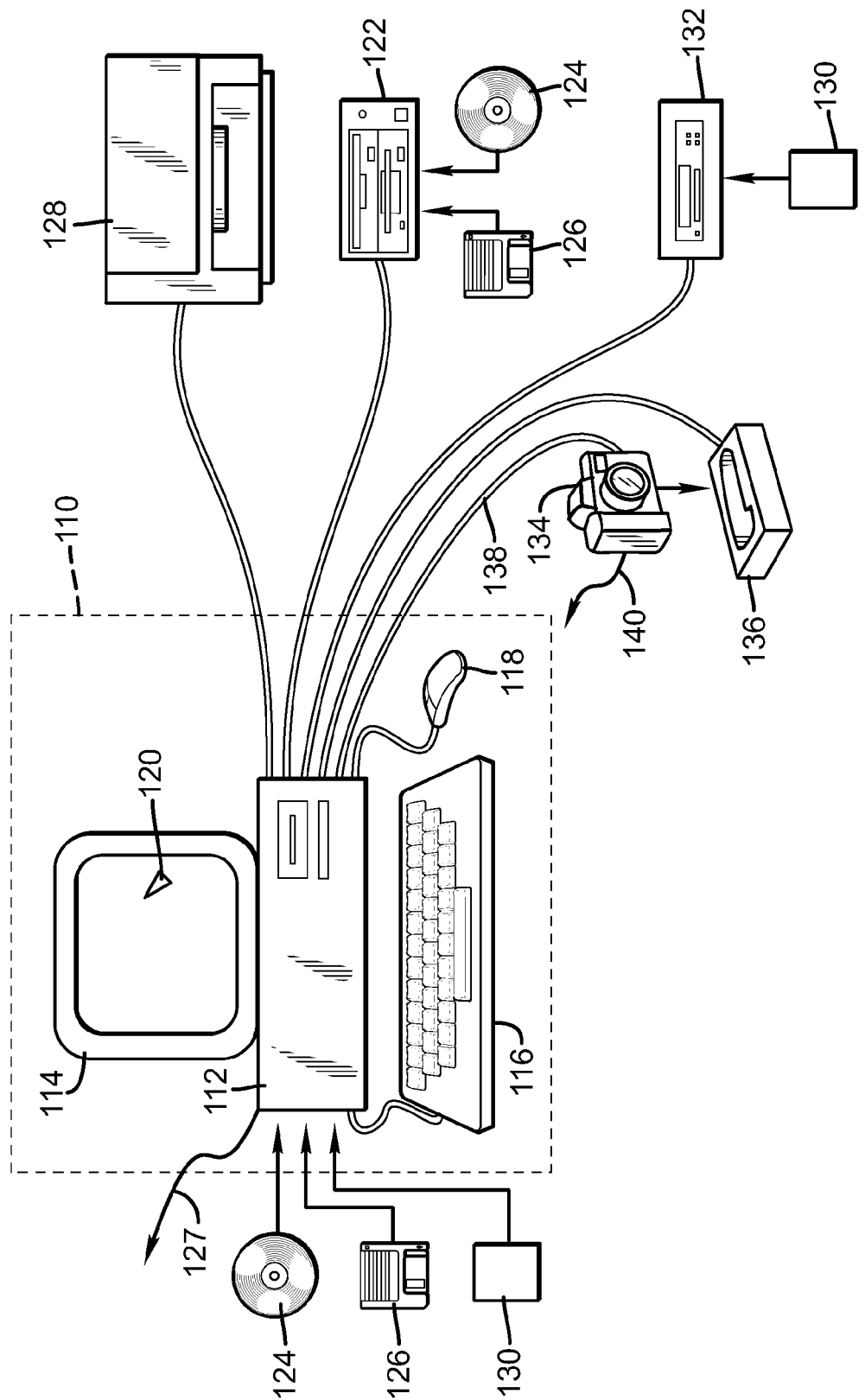
FIG. 1 is a perspective of a computer system including a digital camera for implementing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but can be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by a graphical user interface. A keyboard 116 is also connected to the microprocessor based unit 112 for permitting a user to input information to the software. As an alternative to using the keyboard 116 for input, a mouse 118 can be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a way of inputting the software programs and other information to the microprocessor based unit 112. In addition, a floppy disk 126 can also include a software program, and is inserted into the microprocessor-based unit 112 for inputting the software program. The compact disk-read only memory (CD-ROM) 124 or the floppy disk 126 can alternatively be inserted into externally located disk drive unit 122 which is connected to the microprocessor-based unit 112. Still further, the microprocessor-based unit 112 can be programmed, as is well known in the art, for storing the software program internally. The microprocessor-based unit 112 can also have a network connection 127, such as a telephone line, to an external network, such as a local area network or the Internet. A printer 128 can also be connected to the microprocessor-based unit 112 for printing a hardcopy of the output from the computer system 110.

Images can also be displayed on the display 114 via a personal computer card (PC card) 130, such as, as it was formerly known, a PCMCIA card (based on the specifications of the Personal Computer Memory Card International Association) which contains digitized images electronically embodied in the PC card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images can also be input via the compact disk 124, the floppy disk 126, or the network connection 127. Any images stored in the PC card 130, the floppy disk 126 or the compact disk 124, or input through the network connection 127, can have been obtained from a variety of sources, such as a digital camera (not shown) or a scanner (not shown). Images can also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm can be stored in any of the storage devices heretofore mentioned and applied to images in order to interpolate sparsely populated images.

Figure 2:
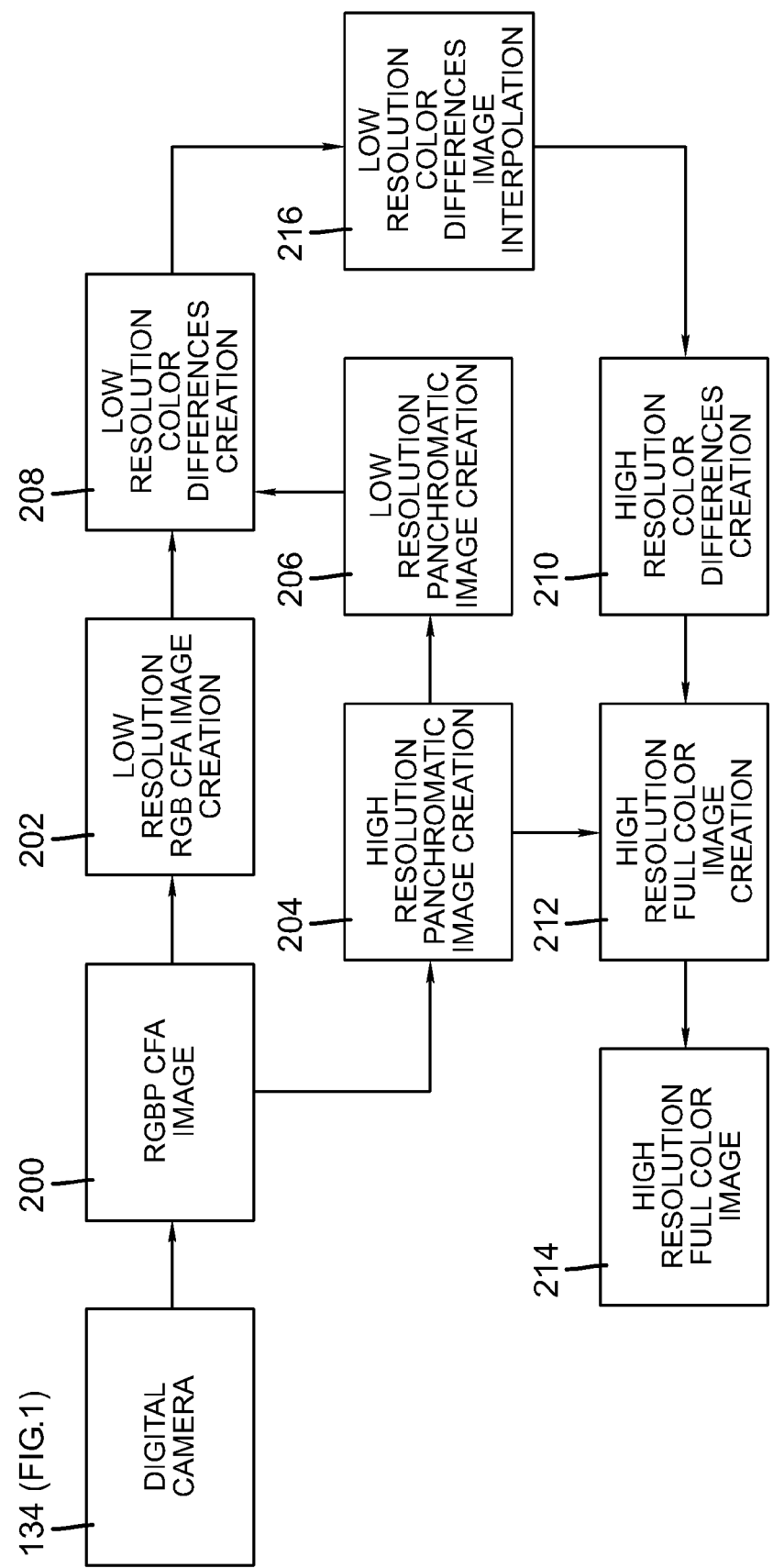
FIG. 2 is a block diagram of a preferred embodiment.

FIG. 2 is a high level diagram of the preferred embodiment. The digital camera 134 is responsible for creating an original digital red-green-blue-panchromatic (RGBP) color filter array (CFA) image 200, also referred to as the digital RGBP CFA image or the RGBP CFA image. This image is considered to be a sparsely sampled image because each pixel in the image contains only one pixel value of red, green, blue, or panchromatic data. A copy of block 200 is passed to the low resolution RGB CFA image creation block 202. Block 202 creates a digital low resolution RGB CFA image, also referred to as a low resolution RGB CFA image, from the RGBP CFA image. Another copy of block 200 is passed to the high resolution panchromatic image creation block 204. Block 204 creates a digital high resolution panchromatic image also referred to as the high resolution panchromatic image from the RGBP CFA image. The output of block 204 is passed to the low resolution panchromatic image creation block 206. Block 206 creates a digital low resolution panchromatic image, also referred to as a low resolution panchromatic image, from the high resolution panchromatic image. The output of block 206 and the output of block 202 are passed to the low resolution color differences creation block 208. Block 208 creates a low resolution color differences image by subtracting the low resolution panchromatic image from the low resolution RGB CFA image. The output of block 208 is passed to the low resolution color differences image interpolation block 216. Block 216 performs a Bayer CFA interpolation operation on the low resolution color differences. An example of such a Bayer CFA interpolation can be found in U.S. Pat. No. 5,506,619, Hamilton et al., though is should be apparent to those skilled in the art that other Bayer CFA interpolation methods can be used. The result of block 216 is a digital interpolated low resolution color differences image, also referred to as an interpolated low resolution color differences image, with three color difference values for each pixel. The output of block 216 is passed to the high resolution color differences creation block 210. Block 210 creates a digital high resolution color differences image, also referred to as the high resolution color differences image, by bilinearly interpolating (upsizing) the low resolution color differences image. The output of block 210 and the output of block 204 are passed to the high resolution full color image creation block 212. Block 212 creates a digital high resolution full color image also referred to as the high resolution full color image 214 by adding the high resolution panchromatic image to the high resolution color differences image.

Figure 3:
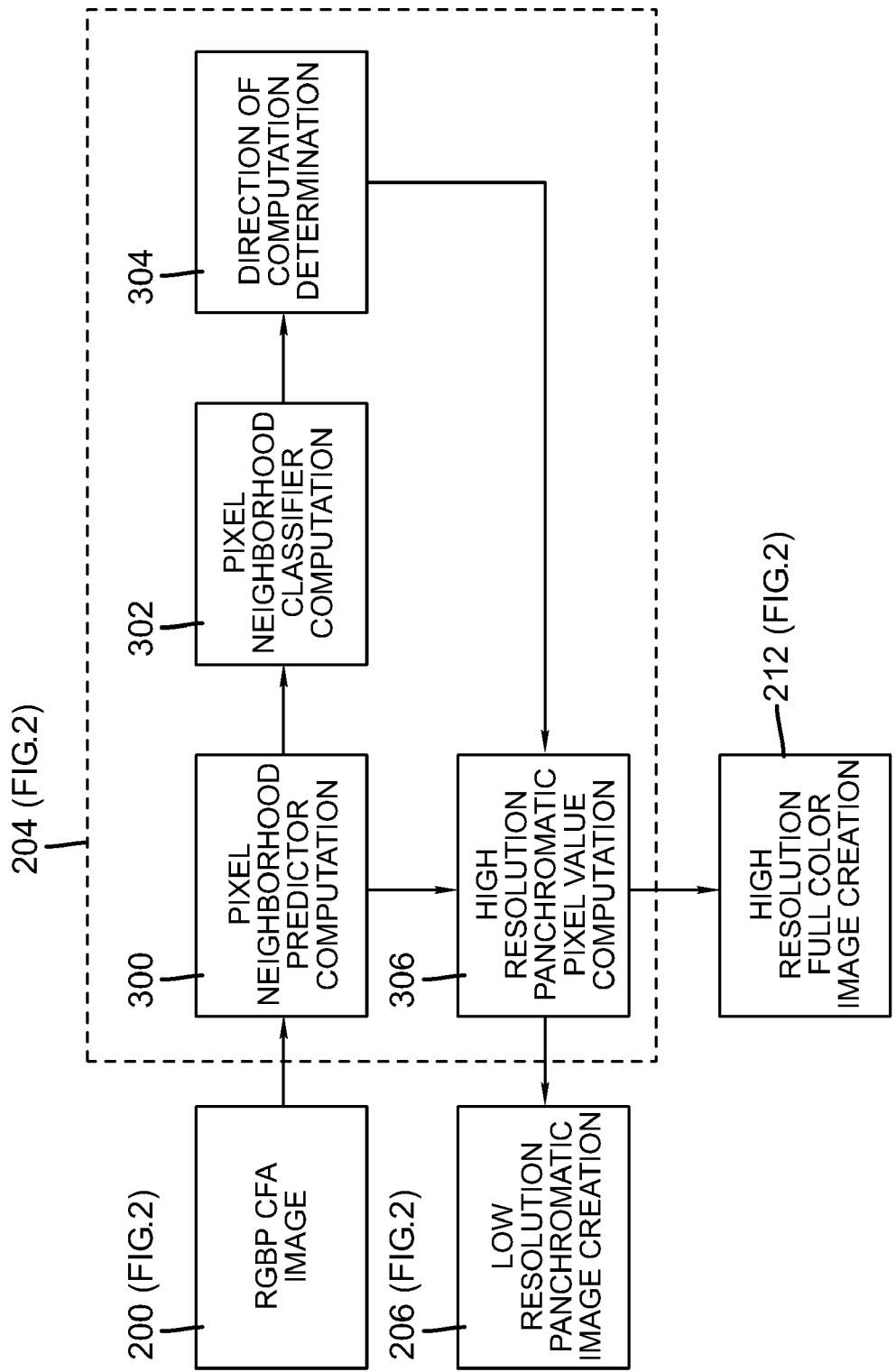
FIG. 3 is a more detailed block diagram of block 204 in FIG. 2.

FIG. 3 is a more detailed diagram of the high resolution panchromatic image creation block 204 in FIG. 2. The RGBP CFA image 200 (FIG. 2) is passed to the pixel neighborhood predictor computation block 300. Block 300 computes a set of pixel neighborhood predictor values. The results of block 300 are passed to the pixel neighborhood classifier computation block 302. Block 302 computes a set of pixel neighborhood classifier values with each classifier value corresponding to one of the predictor values computed in block 300. The results of block 302 are passed to the direction of computation determination block 304. Block 304 determines a preferred direction of computation based on the set of classifier values produced in block 302. The result of block 304 and the results of block 300 are passed to the high resolution panchromatic pixel value computation block 306. Block 306 selects an appropriate predictor value from the results of block 300 corresponding to the direction determined by block 304. This selected predictor value then become the interpolated high resolution panchromatic pixel value. The results of block 306 become the output of block 204 (FIG. 2).

FIG. 4 is a region of pixels repeated throughout the RGBP CFA image block 200 (FIG. 2). The salient aspect of FIG. 4 is the two rows of panchromatic pixels are separated by alternating rows of red and green pixels and green and blue pixels.

FIG. 5 is a region of pixels used by low resolution RGB CFA image creation block 202 (FIG. 2) to produce the region of pixels illustrated in FIG. 6. The following expressions are used in the preferred embodiment to produce the pixel values in FIG. 6.

$R_1' = k(R_1 + R_3 + R_5)$ $G_2' = k(G_4 + G_6 + G_8)$ $G_3' = k(G_9 + G_{11} + G_{13})$ $B_4' = k(B_{12} + B_{14} + B_{16})$

In these expression k is a scale factor to produce the desired pixel value range of the output values. Typical values for k are one-third to produce an average pixel value and one to produce a summed pixel value. It is noted that within the scope of this invention the creation of one pixel value from three pixel values is a form of subsampling. In an alternate embodiment of the present invention a different set of expressions for block 202 are used as follows.

$R_1' = k(R_1 + R_3 + R_5)$ $G_2' = k(G_2 + G_4 + G_6)$ $G_3' = k(G_9 + G_{11} + G_{13})$ $B_4' = k(B_{10} + B_{12} + B_{14})$

FIG. 7 is a region of pixels used by both the pixel neighborhood prediction computation block 300 (FIG. 3) and the pixel neighborhood classifier computation block 302 (FIG. 3). There are two sets of predictor values computed by block 300 (FIG. 3). For the case when the central pixel of the pixel neighborhood is a green pixel, such as $G_{15}$ in FIG. 7, the following predictor values are computed.

$p_{slash} = (P_{10} + P_{20})/2$ $p_{vertical} = (P_9 + P_{21})/2$ $p_{backslash} = (P_8 + P_{22})/2$ $p_{horizontal} = G_{15}$ $p_{left} = G_{15}$ $p_{right} = G_{15}$ $p_{cubic} = (-P_3 + 4P_9 + 4P_{21} - P_{27})/6$ For the case when the central pixel of the pixel neighborhood is not a green pixel, such as $B_{16}$ in FIG. 7, the following predictor values are computed.

$p_{slash} = (P_{11} + P_{21})/2$ $p_{vertical} = (P_{10} + P_{22})/2$ $p_{backslash} = (P_9 + P_{23})/2$ $p_{horizontal} = (G_{15} + G_{17})/2$ $p_{left} = G_{15}$ $p_{right} = G_{17}$ $p_{cubic} = (-P_4 + 4P_{10} + 4P_{22} - P_{28})/6$ There is one set of classifier values computed by block 302 (FIG. 3). Though the color of the central pixel in a given neighborhood can be different, the same expressions are used for computing the classifiers. Two examples are now given. For the case when the central pixel of the pixel neighborhood is a green pixel, such as $G_{15}$ in FIG. 7, the following classifier values are computed.

$c_{slash} = |P_{11} - P_{21}| + |P_{10} - P_{20}| + |P_9 - P_{19}| + |2p_{cubic} - P_{10} - P_{20}|/4$ $c_{vertical} = |P_{10} - P_{22}| + |P_9 - P_{21}| + |P_8 - P_{20}| + |2p_{cubic} - P_9 - P_{21}|/4$ $c_{backslash} = |P_9 - P_{23}| + |P_8 - P_{22}| + |P_7 - P_{21}| + |2p_{cubic} - P_8 - P_{22}|/4$ $c_{horizontal} = |B_{14} - B_{16}| + |P_8 - P_{10}| + |P_{20} - P_{22}| + |2G_{15} - G_{13} - G_{17}|/8 + t_1$ $c_{left} = |G_{15} - G_{13}| + |P_9 - P_{21}| + |P_8 - P_{20}| + |2G_{15} - G_{13} - G_{17}|/8 + t_2$ $c_{right} = |G_{15} - G_{17}| + |P_9 - P_{21}| + |P_{10} - P_{22}| + |2G_{15} - G_{13} - G_{17}|/8 + t_2$ The values $t_1$ and $t_2$ are threshold values that are chosen to reduce, but not eliminate, the likelihood of $c_{horizontal}$, $c_{left}$, and $c_{right}$ of being smaller than $c_{slash}$, $c_{vertical}$, or $c_{backslash}$. Typical values for $t_1$ and $t_2$ are 20 and 40 for an 8-bit pixel value data range. For the case when the central pixel of the pixel neighborhood is not a green pixel, such as $B_{16}$ in FIG. 7, the following classifier values are computed.

$$c_{slash}=|P_{12}-P_{22}|+|P_{11}-P_{21}|+|P_{10}-P_{20}|+|2p_{cubic}-P_{11}-P_{21}|/4$$

$$c_{vertical}=|P_{11}-P_{23}|+|P_{10}-P_{22}|+|P_9-P_{21}|+|2p_{cubic}-P_{10}-P_{22}|/4$$

$$c_{backslash}=|P_{10}-P_{24}|+|P_9-P_{23}|+|P_8-P_{22}|+|2p_{cubic}-P_9-P_{23}|/4$$

$$c_{horizontal}=|G_{15}-G_{17}|+|P_9-P_{11}|+|P_{21}-P_{23}|+|2B_{16}-B_{14}-B_{18}|8+t_1$$

$$c_{left}=|B_{16}-B_{14}|+|P_{10}-P_{22}|+|P_9-P_{21}|+|2B_{16}-B_{14}-B_{18}|/8+t_2$$

$$c_{right}=|B_{16}-B_{18}|+|P_{10}-P_{22}|+|P_{11}-P_{23}|+|2B_{16}-B_{14}-B_{18}|/8+t_2$$

It should be noted that these expressions are substantially the same in both examples. For a red pixel centered neighborhood, one would take the classifiers from the second example and exchange red pixel values for blue pixel values.

Figures 8, 9:
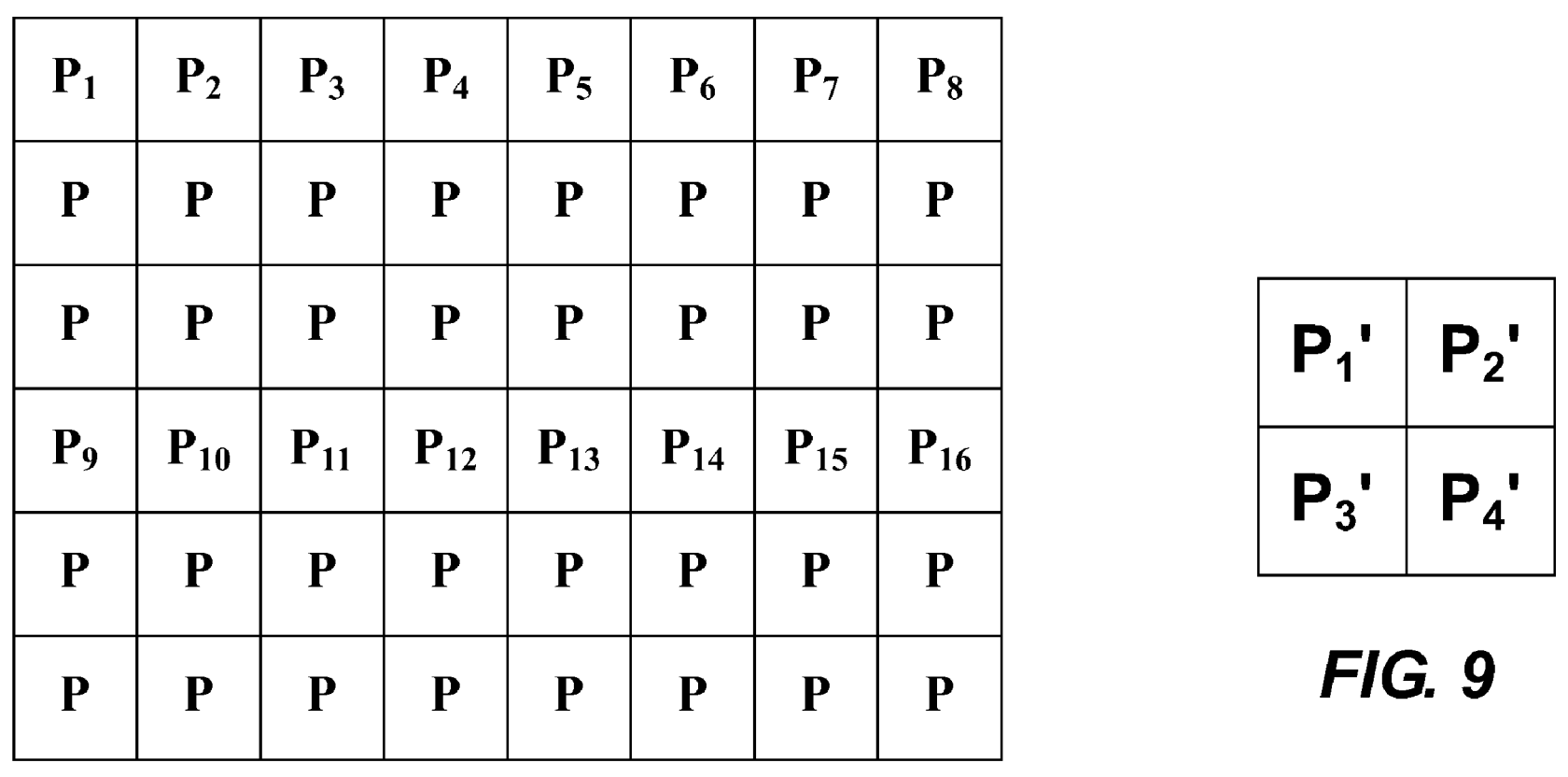

Returning to FIG. 3, the classifier values computed in block 302 are passed to the direction of computation determination block 304. In block 304 each classifier value is compared to an activity threshold, $t_{activity}$. A typical value for $t_{activity}$ is 200 for an 8-bit pixel value data range. If all classifier values are greater than or equal to the activity threshold, then the direction of computation becomes a special case that is associated with the predictor value $p_{cubic}$. Failing this first test, the classifier with the smallest value is determined. The direction associated with this classifier becomes the output of block 304. The output of block 304 and the output of block 300 are passed to the high resolution panchromatic pixel value computation block 306. In block 306 for each pixel neighborhood centered on a red, green, or blue pixel, the predictor value corresponding to the direction of computation determined in block 304 becomes the interpolated panchromatic value. A portion of the resulting high resolution panchromatic channel is illustrated in FIG. 8. In FIG. 8 the values without subscripts represent original existing panchromatic values and the values with subscripts represent interpolated panchromatic values. Additionally, FIG. 8 is a region of pixels used by low resolution panchromatic image creation block 206 (FIG. 2) to produce the region of pixels illustrated in FIG. 9. The following expressions are used in the preferred embodiment to produce the pixel values in FIG. 9.

$$P_1'=k(P_1+P_3+P_5)$$

$$P_2'=k(P_4+P_6+P_8)$$

$$P_3'=k(P_9+P_{11}+P_{13})$$

$$P_4'=k(P_{12}+P_{14}+P_{16})$$

In these expression k is a scale factor to produce the desired pixel value range of the output values. Typically, k is one-third to produce an average pixel value. In an alternate embodiment of the present invention a different set of expressions for block 206 (FIG. 2) is used as follows.

$$P_1'=k(P_1+P_3+P_5)$$

$$P_2'=k(P_2+P_4+P_6)$$

$$P_3'=k(P_9+P_{11}+P_{13})$$

$$P_4'=k(P_{10}+P_{12}+P_{14})$$

FIG. 10 is a region of pixels created from the high resolution color differences creation block 210 (FIG. 2). In FIG. 10, $X_1$ and $X_4$ represent existing color difference values in the low resolution color differences image created by block 208 (FIG. 2). Interpolated color difference values $X_2$ and $X_3$ are computed in block 210 (FIG. 2) with the following expressions:

$$X_2=(2X_1+X_4)/3$$

$$X_3=(X_1+2X_4)/3$$

As is standard practice for bilinear interpolation, this operation is first performed on each row to triple the amount of color difference values in each row. The computation is then repeated in the vertical direction on each column to triple the amount of color difference values in each column. The output of block 210 is sent to the high resolution full color image creation block 212.

An alternate embodiment of the present invention is now described. FIG. 2 and FIG. 3 are as in the preferred embodiment. FIG. 11 is an alternate region of pixels repeated throughout the RGBP CFA image block 200 (FIG. 2). The salient aspect of FIG. 11 is that two rows of panchromatic pixels are separated by alternating rows of three adjacent red then three adjacent green pixels and three adjacent green and then three adjacent blue pixels.

FIG. 12 is an alternate region of pixels used by low resolution RGB CFA image creation block 202 (FIG. 2) to produce the region of pixels illustrated in FIG. 6. The following expressions are used in this alternate embodiment to produce the pixel values in FIG. 6.

$$R_1'=k(R_{11}+R_{12}+R_{13})$$

$$G_2'=k(G_{14}+G_{15}+G_{16})$$

$$G_3'=k(G_{21}+G_{22}+G_{23})$$

$$B_4'=k(B_{24}+B_{25}+B_{26})$$

In these expression k is a scale factor to produce the desired pixel value range of the output values. Typical values for k are one-third to produce an average pixel value and one to produce a summed pixel value. It is noted that within the scope of this invention the creation of one pixel value from three pixel values is a form of subsampling.

FIG. 13 is an alternate region of pixels used by both the pixel neighborhood prediction computation block 300 (FIG. 3) and the pixel neighborhood classifier computation block 302 (FIG. 3). For the case when the central pixel of the pixel neighborhood is a blue or red pixel, such as $B_{33}$ in FIG. 13, the following predictor values are computed.

$$P_{slash} = (P_{42} + P_{24})/2$$

$$P_{vertical} = (P_{23} + P_{43})/2$$

$$P_{backslash} = (P_{22} + P_{44})/2$$

$$P_{horizontal} = \begin{cases} (3G_{31} + G_{35})/4, & \text{for } B_{32} \\ (G_{31} + G_{35})/2, & \text{for } B_{33} \\ (G_{31} + 3G_{35})/4, & \text{for } B_{34} \end{cases}$$

$$P_{left} = (P_{23} + R_{43})/2$$

$$P_{right} = (P_{23} + P_{43})/2$$

$$P_{cubic} = (-P_{13} + 4P_{23} + 4P_{43} - P_{53})/6$$

For the case when the central pixel of the pixel neighborhood is a green pixel, then $p_{horizontal}$ becomes simply the green central pixel value. There is one set of classifier values computed by block 302 (FIG. 3). Though the color of the central pixel in a given neighborhood can be different, the same expressions are used for computing the classifiers. Returning to FIG. 13, the central pixel of the pixel neighborhood is $B_{33}$ for which the following classifier values are computed.

$$c_{slash} = |P_{25} - P_{43}| + |P_{24} - P_{42}| + |P_{23} - P_{41}| + |2p_{cubic} - P_{24} - P_{42}|/4$$

$$c_{vertical} = |P_{24} - P_{44}| + |P_{23} - P_{43}| + |P_{22} - P_{42}| + |2p_{cubic} - P_{23} - P_{43}|/4$$

$$c_{backslash} = |P_{23} - P_{45}| + |P_{22} - P_{44}| + |P_{21} - P_{43}| + |2p_{cubic} - P_{22} - P_{44}|/4$$

$$c_{horizontal} = \frac{3}{2}(|P_{22} - P_{24}| + |P_{42} - P_{44}|) + t_1$$

$$c_{left} = \frac{3}{2}(|P_{23} - P_{43}| + |P_{22} - P_{42}|) + t_2$$

$$c_{right} = \frac{3}{2}(|P_{23} - P_{43}| + |P_{24} - P_{44}|) + t_2$$

The values $t_1$ and $t_2$ are threshold values that are chosen to reduce, but not eliminate, the likelihood of $c_{horizontal}$, $c_{left}$, and $c_{right}$ of being smaller than $c_{slash}$, $c_{vertical}$, or $c_{backslash}$. Typical values for $t_1$ and $t_2$ are 50 and 50 for an 8-bit pixel value data range.

Returning to FIG. 3, the classifier values computed in block 302 are passed to the direction of computation determination block 304. In block 304 each classifier value is compared to an activity threshold, $t_{activity}$. A typical value for $t_{activity}$ is 200 for an 8-bit pixel value data range. If all classifier values are greater than or equal to the activity threshold, then the direction of computation becomes a special case that is associated with the predictor value $p_{cubic}$. Failing this first test, the classifier with the smallest value is determined. The direction associated with this classifier becomes the output of block 304. The output of block 304 and the output of block 300 are passed to the high resolution panchromatic pixel value computation block 306. In block 306 for each pixel neighborhood centered on a red, green, or blue pixel, the predictor value corresponding to the direction of computation determined in block 304 becomes the interpolated panchromatic value. A portion of the resulting high resolution panchromatic channel is illustrated in FIG. 8. In FIG. 8 the values without subscripts represent original existing panchromatic values and the values with subscripts represent interpolated panchromatic values. Additionally, FIG. 8 is a region of pixels used by low resolution panchromatic image creation block 206 (FIG. 2) to produce the region of pixels illustrated in FIG. 9. The following expressions are used in the preferred embodiment to produce the pixel values in FIG. 9.

$$P_1' = k(P_1 + P_3 + P_5)$$

$$P_2' = k(P_4 + P_6 + P_8)$$

$$P_3' = k(P_9 + P_{11} + P_{13})$$

$$P_4' = k(P_{12} + P_{14} + P_{16})$$

In these expression k is a scale factor to produce the desired pixel value range of the output values. Typically, k is one-third to produce an average pixel value. In an alternate embodiment of the present invention a different set of expressions for block 206 (FIG. 2) is used as follows.

$$P_1' = k(P_1 + P_3 + P_5)$$

$$P_2' = k(P_2 + P_4 + P_6)$$

$$P_3' = k(P_9 + P_{11} + P_{13})$$

$$P_4' = k(P_{10} + P_{12} + P_{14})$$

FIG. 10 is a region of pixels created from the high resolution color differences creation block 210 (FIG. 2). In FIG. 10, $X_1$ and $X_4$ represent existing color difference values in the low resolution color differences image created by block 208 (FIG. 2). Interpolated color difference values $X_2$ and $X_3$ are computed in block 210 (FIG. 2) with the following expressions:

$$X_2 = (2X_1 + X_4)/3$$

$$X_3 = (X_1 + 2X_4)/3$$

As is standard practice for bilinear interpolation, this operation is first performed on each row to triple the amount of color difference values in each row. The computation is then repeated in the vertical direction on each column to triple the amount of color difference values in each column. The output of block 210 is sent to the high resolution full color image creation block 212.

A second alternate embodiment of the present invention is now described. FIG. 2 and FIG. 3 are as in the preferred embodiment. FIG. 14 is an alternate region of pixels repeated throughout the RGBP CFA image block 200 (FIG. 2). The salient aspect of FIG. 14 is that single rows of panchromatic pixels are separated by alternating rows of four adjacent red then four adjacent green pixels and four adjacent green and then four adjacent blue pixels.

FIG. 15 is an alternate region of pixels used by low resolution RGB CFA image creation block 202 (FIG. 2) to produce the region of pixels illustrated in FIG. 6. The following expressions are used in this alternate embodiment to produce the pixel values in FIG. 6.

$$R_1' = k(R_{11} + R_{12} + R_{13} + R_{14} + R_{21} + R_{22} + R_{23} + R_{24})$$

$$G_2' = k(G_{15} + G_{16} + G_{17} + G_{18} + G_{25} + G_{26} + G_{27} + G_{28})$$

$$G_3' = k(G_{31} + G_{32} + G_{33} + G_{34} + G_{41} + G_{42} + G_{43} + G_{44})$$

$$B_4' = k(B_{35} + B_{36} + B_{37} + B_{38} + B_{45} + B_{46} + B_{47} + B_{48})$$

In these expression k is a scale factor to produce the desired pixel value range of the output values. Typical values for k are one-eighth to produce an average pixel value and one to produce a summed pixel value. It is noted that within the scope of this invention the creation of one pixel value from eight pixel values is a form of subsampling.

FIG. 16 shows four alternate regions of pixels used by both the pixel neighborhood prediction computation block 300 (FIG. 3) and the pixel neighborhood classifier computation block 302 (FIG. 3). For the case when one of the central pixels of the pixel neighborhood is a blue pixel, such as $B_{24}$ in FIG. 16A, the following predictor values are computed.

$$p_{slash} = \begin{cases} (P_{31} + P_{13})/2, & \text{for } B_{22} \\ (P_{32} + P_{14})/2, & \text{for } B_{23} \\ (P_{33} + P_{15})/2, & \text{for } B_{24} \\ (P_{34} + P_{16})/2, & \text{for } B_{25} \end{cases}$$

$$p_{vertical} = \begin{cases} (P_{12} + P_{32})/2, & \text{for } B_{22} \\ (P_{13} + P_{33})/2, & \text{for } B_{23} \\ (P_{14} + P_{34})/2, & \text{for } B_{24} \\ (P_{15} + P_{35})/2, & \text{for } B_{25} \end{cases}$$

-continued $$p_{backlash} = \begin{cases} (P_{11}+P_{33})/2, & \text{for } B_{22} \\ (P_{12}+P_{34})/2, & \text{for } B_{23} \\ (P_{13}+P_{35})/2, & \text{for } B_{24} \\ (P_{14}+P_{36})/2, & \text{for } B_{25} \end{cases}$$

$$p_{horizontal} = \begin{cases} 6G_{21}+3R_{41}+B_{22}, & \text{for } B_{22} \\ 6G_{21}+3R_{41}+B_{23}, & \text{for } B_{23} \\ 6G_{26}+3R_{46}+B_{24}, & \text{for } B_{24} \\ 6G_{26}+3R_{46}+B_{25}, & \text{for } B_{25} \end{cases}$$

For the case when one of the central pixels of the pixel neighborhood is a red pixel, such as $R_{24}$ in FIG. 16B, the following predictor values are computed predictor values are computed.

$$p_{slash} = \begin{cases} (P_{31}+P_{13})/2, & \text{for } R_{22} \\ (P_{32}+P_{14})/2, & \text{for } R_{23} \\ (P_{33}+P_{15})/2, & \text{for } R_{24} \\ (P_{34}+P_{16})/2, & \text{for } R_{25} \end{cases}$$

$$p_{vertical} = \begin{cases} (P_{12}+P_{32})/2, & \text{for } R_{22} \\ (P_{13}+P_{33})/2, & \text{for } R_{23} \\ (P_{14}+P_{34})/2, & \text{for } R_{24} \\ (P_{15}+P_{35})/2, & \text{for } R_{25} \end{cases}$$

$$p_{backslash} = \begin{cases} (P_{11}+P_{33})/2, & \text{for } R_{22} \\ (P_{12}+P_{34})/2, & \text{for } R_{23} \\ (P_{13}+P_{35})/2, & \text{for } R_{24} \\ (P_{14}+P_{36})/2, & \text{for } R_{25} \end{cases}$$

$$p_{horizontal} = \begin{cases} 6G_{21}+3R_{22}+B_{41}, & \text{for } R_{22} \\ 6G_{21}+3R_{23}+B_{41}, & \text{for } R_{23} \\ 6G_{26}+2R_{24}+B_{46}, & \text{for } R_{24} \\ 6G_{26}+3R_{25}+B_{46}, & \text{for } R_{25} \end{cases}$$

For the case when one of the central pixels of the pixel neighborhood is a green pixel, such as $G_{24}$ in FIG. 16C, the following predictor values are computed predictor values are computed.

$$p_{slash} = \begin{cases} (P_{31}+P_{13})/2, & \text{for } G_{22} \\ (P_{32}+P_{14})/2, & \text{for } G_{23} \\ (P_{33}+P_{15})/2, & \text{for } G_{24} \\ (P_{34}+P_{16})/2, & \text{for } G_{25} \end{cases}$$

$$p_{vertical} = \begin{cases} (P_{12}+P_{32})/2, & \text{for } G_{22} \\ (P_{13}+P_{33})/2, & \text{for } G_{23} \\ (P_{14}+P_{34})/2, & \text{for } G_{24} \\ (P_{15}+P_{35})/2, & \text{for } G_{25} \end{cases}$$

$$p_{backslash} = \begin{cases} (P_{11}+P_{33})/2, & \text{for } G_{22} \\ (P_{12}+P_{34})/2, & \text{for } G_{23} \\ (P_{13}+P_{35})/2, & \text{for } G_{24} \\ (P_{14}+P_{36})/2, & \text{for } G_{25} \end{cases}$$

-continued $$p_{horizontal} = \begin{cases} 6G_{22}+3R_{42}+B_{21}, & \text{for } G_{22} \\ 6G_{23}+3R_{43}+B_{21}, & \text{for } G_{23} \\ 6G_{24}+2R_{44}+B_{26}, & \text{for } G_{24} \\ 6G_{25}+3R_{45}+B_{26}, & \text{for } G_{25} \end{cases}$$

For the case when one of the central pixels of the pixel neighborhood is a green pixel, such as $G_{24}$ in FIG. 16D, the following predictor values are computed predictor values are computed.

$$p_{slash} = \begin{cases} (P_{31}+P_{13})/2, & \text{for } G_{22} \\ (P_{32}+P_{14})/2, & \text{for } G_{23} \\ (P_{33}+P_{15})/2, & \text{for } G_{24} \\ (P_{34}+P_{16})/2, & \text{for } G_{25} \end{cases}$$

$$p_{vertical} = \begin{cases} (P_{12}+P_{32})/2, & \text{for } G_{22} \\ (P_{13}+P_{33})/2, & \text{for } G_{23} \\ (P_{14}+P_{34})/2, & \text{for } G_{24} \\ (P_{15}+P_{35})/2, & \text{for } G_{25} \end{cases}$$

$$p_{backslash} = \begin{cases} (P_{11}+P_{33})/2, & \text{for } G_{22} \\ (P_{12}+P_{34})/2, & \text{for } G_{23} \\ (P_{13}+P_{35})/2, & \text{for } G_{24} \\ (P_{14}+P_{36})/2, & \text{for } G_{25} \end{cases}$$

$$p_{horizontal} = \begin{cases} 6G_{22}+3R_{21}+B_{42}, & \text{for } G_{22} \\ 6G_{23}+3R_{21}+B_{43}, & \text{for } G_{23} \\ 6G_{24}+2R_{26}+B_{44}, & \text{for } G_{24} \\ 6G_{25}+3R_{26}+B_{45}, & \text{for } G_{25} \end{cases}$$

There is one set of classifier values computed by block 302 (FIG. 3). Though the color of the central pixel in a given neighborhood can be different, the same expressions are used for computing the classifiers. Referring to FIG. 16A, the central pixel of the pixel neighborhood is $B_{24}$ and the following classifier values are computed.

$$c_{slash} = \begin{cases} |P_{30}-P_{12}|+|P_{31}-P_{13}|+|P_{32}-P_{14}|, & \text{for } B_{22} \\ |P_{31}-P_{13}|+|P_{32}-P_{14}|+|P_{33}-P_{15}|, & \text{for } B_{23} \\ |P_{32}-P_{14}|+|P_{33}-P_{15}|+|P_{34}-P_{16}|, & \text{for } B_{24} \\ |P_{33}-P_{15}|+|P_{34}-P_{16}|+|P_{35}-P_{17}|, & \text{for } B_{25} \end{cases}$$

$$c_{vertical} = \begin{cases} |P_{11}-P_{31}|+|P_{12}-P_{32}|+|P_{13}-P_{33}|, & \text{for } B_{22} \\ |P_{12}-P_{32}|+|P_{13}-P_{33}|+|P_{14}-P_{34}|, & \text{for } B_{23} \\ |P_{13}-P_{33}|+|P_{14}-P_{34}|+|P_{15}-P_{35}|, & \text{for } B_{24} \\ |P_{15}-P_{34}|+|P_{15}-P_{35}|+|P_{16}-P_{36}|, & \text{for } B_{25} \end{cases}$$

$$c_{backlash} = \begin{cases} |P_{10}-P_{32}|+|P_{11}-P_{33}|+|P_{12}-P_{34}|, & \text{for } B_{22} \\ |P_{11}-P_{33}|+|P_{12}-P_{34}|+|P_{13}-P_{35}|, & \text{for } B_{23} \\ |P_{12}-P_{34}|+|P_{13}-P_{35}|+|P_{14}-P_{36}|, & \text{for } B_{24} \\ |P_{13}-P_{35}|+|P_{14}-P_{36}|+|P_{15}-P_{37}|, & \text{for } B_{25} \end{cases}$$

$$c_{horizontal} = \begin{cases} |B_{22}-B_{24}|+|P_{11}-P_{13}|+|P_{31}-P_{33}|+t, & \text{for } B_{22} \\ |B_{22}-B_{24}|+|P_{12}-P_{14}|+|P_{32}-P_{34}|+t, & \text{for } B_{23} \\ |B_{23}-B_{25}|+|P_{13}-P_{15}|+|P_{33}-P_{35}|+t, & \text{for } B_{24} \\ |B_{23}-B_{25}|+|P_{14}-P_{16}|+|P_{34}-P_{36}|+t, & \text{for } B_{25} \end{cases}$$

The value t is a threshold value that is chosen to reduce, but not eliminate, the likelihood of $c_{horizontal}$, of being smaller than $c_{slash}$, $c_{vertical}$ or $c_{backslash}$. A typical values for t is 20 for an 8-bit pixel value data range. Referring to FIG. 16B, the central pixel of the pixel neighborhood is $R_{24}$ and the following classifier values are computed.

$$c_{slash} = \begin{cases} |P_{30}-P_{12}|+|P_{31}-P_{13}|+|P_{32}-P_{14}|, & \text{for } R_{22} \\ |P_{31}-P_{13}|+|P_{32}-P_{14}|+|P_{33}-P_{15}|, & \text{for } R_{23} \\ |P_{32}-P_{14}|+|P_{33}-P_{15}|+|P_{34}-P_{16}|, & \text{for } R_{24} \\ |P_{33}-P_{15}|+|P_{34}-P_{16}|+|P_{35}-P_{17}|, & \text{for } R_{25} \end{cases}$$

$$c_{vertical} = \begin{cases} |P_{11}-P_{31}|+|P_{12}-P_{32}|+|P_{13}-P_{33}|, & \text{for } R_{22} \\ |P_{12}-P_{32}|+|P_{13}-P_{33}|+|P_{14}-P_{34}|, & \text{for } R_{23} \\ |P_{13}-P_{33}|+|P_{14}-P_{34}|+|P_{15}-P_{35}|, & \text{for } R_{24} \\ |P_{15}-P_{34}|+|P_{15}-P_{35}|+|P_{16}-P_{36}|, & \text{for } R_{25} \end{cases}$$

$$c_{backlash} = \begin{cases} |P_{10}-P_{32}|+|P_{11}-P_{33}|+|P_{12}-P_{34}|, & \text{for } R_{22} \\ |P_{11}-P_{33}|+|P_{12}-P_{34}|+|P_{13}-P_{35}|, & \text{for } R_{23} \\ |P_{12}-P_{34}|+|P_{13}-P_{35}|+|P_{14}-P_{36}|, & \text{for } R_{24} \\ |P_{13}-P_{35}|+|P_{14}-P_{36}|+|P_{15}-P_{37}|, & \text{for } R_{25} \end{cases}$$

$$c_{horizontal} = \begin{cases} |R_{22}-R_{24}|+|P_{11}-P_{13}|+|P_{31}-P_{33}|+t, & \text{for } R_{22} \\ |R_{22}-R_{24}|+|P_{12}-P_{14}|+|P_{32}-P_{34}|+t, & \text{for } R_{23} \\ |R_{23}-R_{25}|+|P_{13}-P_{15}|+|P_{33}-P_{35}|+t, & \text{for } R_{24} \\ |R_{23}-R_{25}|+|P_{14}-P_{16}|+|P_{34}-P_{36}|+t, & \text{for } R_{25} \end{cases}$$

The value t is a threshold value that is chosen to reduce, but not eliminate, the likelihood of $c_{horizontal}$, of being smaller than $c_{slash}$, $c_{vertical}$, or $c_{backslash}$. A typical values for t is 20 for an 8-bit pixel value data range. Referring to FIG. 16C, the central pixel of the pixel neighborhood is $G_{24}$ and the following classifier values are computed.

$$c_{slash} = \begin{cases} |P_{30}-P_{12}|+|P_{31}-P_{13}|+|P_{32}-P_{14}|, & \text{for } G_{22} \\ |P_{31}-P_{13}|+|P_{32}-P_{14}|+|P_{33}-P_{15}|, & \text{for } G_{23} \\ |P_{32}-P_{14}|+|P_{33}-P_{15}|+|P_{34}-P_{16}|, & \text{for } G_{24} \\ |P_{33}-P_{15}|+|P_{34}-P_{16}|+|P_{35}-P_{17}|, & \text{for } G_{25} \end{cases}$$

$$c_{vertical} = \begin{cases} |P_{11}-P_{31}|+|P_{12}-P_{32}|+|P_{13}-P_{33}|, & \text{for } G_{22} \\ |P_{12}-P_{32}|+|P_{13}-P_{33}|+|P_{14}-P_{34}|, & \text{for } G_{23} \\ |P_{13}-P_{33}|+|P_{14}-P_{34}|+|P_{15}-P_{35}|, & \text{for } G_{24} \\ |P_{15}-P_{34}|+|P_{15}-P_{35}|+|P_{16}-P_{36}|, & \text{for } G_{25} \end{cases}$$

$$c_{backlash} = \begin{cases} |P_{10}-P_{32}|+|P_{11}-P_{33}|+|P_{12}-P_{34}|, & \text{for } G_{22} \\ |P_{11}-P_{33}|+|P_{12}-P_{34}|+|P_{13}-P_{35}|, & \text{for } G_{23} \\ |P_{12}-P_{34}|+|P_{13}-P_{35}|+|P_{14}-P_{36}|, & \text{for } G_{24} \\ |P_{13}-P_{35}|+|P_{14}-P_{36}|+|P_{15}-P_{37}|, & \text{for } G_{25} \end{cases}$$

$$c_{horizontal} = \begin{cases} |G_{22}-G_{24}|+|P_{11}-P_{13}|+|P_{31}-P_{33}|+t, & \text{for } G_{22} \\ |G_{22}-G_{24}|+|P_{12}-P_{14}|+|P_{32}-P_{34}|+t, & \text{for } G_{23} \\ |G_{23}-G_{25}|+|P_{13}-P_{15}|+|P_{33}-P_{35}|+t, & \text{for } G_{24} \\ |G_{23}-G_{25}|+|P_{14}-P_{16}|+|P_{34}-P_{36}|+t, & \text{for } G_{25} \end{cases}$$

The value t is a threshold value that is chosen to reduce, but not eliminate, the likelihood of $c_{horizontal}$, of being smaller than $c_{slash}$, $c_{vertical}$, or $c_{backslash}$. A typical value for t is 20 for an 8-bit pixel value data range.

Returning to FIG. 3, the classifier values computed in block 302 are passed to the direction of computation determination block 304. In block 304 each classifier value is compared to an activity threshold, $t_{activity}$. A typical value for $t_{activity}$ is 200 for an 8-bit pixel value data range. If all classifier values are greater than or equal to the activity threshold, then the direction of computation becomes a special case that is associated with the predictor value $p_{cubic}$. Failing this first test, the classifier with the smallest value is determined. The direction associated with this classifier becomes the output of block 304. The output of block 304 and the output of block 300 are passed to the high resolution panchromatic pixel value computation block 306. In block 306 for each pixel neighborhood centered on a red, green, or blue pixel, the predictor value corresponding to the direction of computation determined in block 304 becomes the interpolated panchromatic value. A portion of the resulting high resolution panchromatic channel is illustrated in FIG. 17. In FIG. 17 the values without subscripts represent original existing panchromatic values and the values with subscripts represent interpolated panchromatic values. Additionally, FIG. 17 is a region of pixels used by low resolution panchromatic image creation block 206 (FIG. 2) to produce the region of pixels illustrated in FIG. 9. The following expressions are used in the preferred embodiment to produce the pixel values in FIG. 9.

$$P_1' = k(P_{20}+P_{21}+P_{22}+P_{23}+P_{40}+P_{41}+P_{42}+P_{43})$$

$$P_2' = k(P_{24}+P_{25}+P_{26}+P_{27}+P_{44}+P_{45}+P_{46}+P_{47})$$

$$P_3' = k(P_{60}+P_{61}+P_{62}+P_{63}+P_{80}+P_{81}+P_{82}+P_{83})$$

$$P_4' = k(P_{64}+P_{65}+P_{66}+P_{67}+P_{84}+P_{85}+P_{86}+P_{87})$$

In these expression k is a scale factor to produce the desired pixel value range of the output values. Typically, k is one-eighth to produce an average pixel value.

FIG. 18 is a region of pixels created from the high resolution color differences creation block 210 (FIG. 2). In FIG. 18, $X_1$ and $X_5$ represent existing color difference values in the low resolution color differences image created by block 208 (FIG. 2). Interpolated color difference values $X_2$, $X_3$, and $X_4$ are computed in block 210 (FIG. 2) with the following expressions:

$$X_2 = (3X_1 + X_5)/4$$

$$X_3 = (X_1 + X_5)/2$$

$$X_4 = (X_1 + 3X_5)/4$$

As is standard practice for bilinear interpolation, this operation is first performed on each row to triple the amount of color difference values in each row. The computation is then repeated in the vertical direction on each column to triple the amount of color difference values in each column. The output of block 210 is sent to the high resolution full color image creation block 212.

A third alternate embodiment of the present invention is now described. FIG. 2 and FIG. 3 are as in the preferred embodiment. FIG. 19 is an alternate region of pixels repeated throughout the RGBP CFA image block 200 (FIG. 2). The salient aspect of FIG. 19 is that alternating single rows and single columns of panchromatic pixels are separated by isolated red, green, and blue pixels.

FIG. 20 is an alternate region of pixels used by low resolution RGB CFA image creation block 202 (FIG. 2) to produce the region of pixels illustrated in FIG. 6. The following expressions are used in this alternate embodiment to produce the pixel values in FIG. 6.

$$R_1' = k(R_{11}+R_{12}+R_{21}+R_{22})$$

$G_2'=k(G_{13}+G_{14}+G_{23}+G_{24})$ $G_3'=k(G_{31}+G_{32}+G_{41}+G_{42})$ $B_4'=k(B_{33}+B_{34}+B_{43}+B_{44})$

In these expression k is a scale factor to produce the desired pixel value range of the output values. Typical values for k are one-fourth to produce an average pixel value and one to produce a summed pixel value. It is noted that within the scope of this invention the creation of one pixel value from four pixel values is a form of subsampling.

FIG. 21 shows an alternate region of pixels used by both the pixel neighborhood prediction computation block 300 (FIG. 3) and the pixel neighborhood classifier computation block 302 (FIG. 3). The central pixel, $X_{22}$, is either a red, green, or blue pixel. For the alternate region of pixels, the following predictor values are computed.

$p_{slash}=(P_{31}+P_{13})/2+\lfloor(-P_{31}+P_{21}+P_{12}-P_{13})+(-P_{13}+P_{23}+P_{32}-P_{31})\rfloor/16$ $p_{vertical}=(P_{12}+P_{32})/2+\lfloor(-P_{11}+2P_{21}-P_{31})+(-P_{33}+2P_{23}-P_{13})\rfloor/16$ $p_{backslash}=(P_{11}+P_{33})/2+\lfloor(-P_{11}+P_{21}+P_{32}-P_{33})+(-P_{33}+P_{23}+P_{12}-P_{11})\rfloor/16$ $p_{horizontal}=(P_{21}+P_{23})/2+\lfloor(-P_{31}+2P_{32}-P_{33})+(-P_{11}+2P_{12}-P_{13})\rfloor/16$ $p_{flat}=(P_{11}+P_{12}+P_{21}+P_{23}+P_{31}+P_{32}+P_{33})/8$ For the same alternate region of pixels, the following classifiers are computed.

$c_{slash}=|P_{21}-P_{12}|+|P_{31}-P_{13}|+|P_{32}-P_{23}|+|-P_{31}+P_{21}+P_{12}-P_{13}|+|-P_{31}+P_{32}+P_{23}-P_{13}|$ $c_{vertical}=|P_{11}-P_{31}|+|P_{12}-P_{32}|+|P_{13}-P_{33}|+|-P_{11}+2P_{21}-P_{31}|+|-P_{13}+2P_{23}-P_{33}|$ $c_{backslash}=|P_{11}-P_{33}|+|P_{12}-P_{23}|+|P_{21}-P_{32}|+|-P_{11}+P_{21}+P_{32}-P_{33}|+|-P_{11}+P_{12}+P_{23}-P_{33}|$ $c_{horizontal}=|P_{11}-P_{13}|+|P_{21}-P_{23}|+|P_{31}-P_{33}|+|-P_{11}+2P_{12}-P_{13}|+|-P_{31}+2P_{32}-P_{33}|$ Returning to FIG. 3, the classifier values computed in block 302 are passed to the direction of computation determination block 304. In block 304 each classifier value is compared to an activity threshold, $t_{activity}$. A typical value for $t_{activity}$ is 160 for an 8-bit pixel value data range. If all classifier values are less than or equal to the activity threshold, then the direction of computation becomes a special case that is associated with the predictor value $p_{flat}$. Failing this first test, the classifier with the smallest value is determined. The direction associated with this classifier becomes the output of block 304. The output of block 304 and the output of block 300 are passed to the high resolution panchromatic pixel value computation block 306. In block 306 for each pixel neighborhood centered on a red, green, or blue pixel, the predictor value corresponding to the direction of computation determined in block 304 becomes the interpolated panchromatic value. A portion of the resulting high resolution panchromatic channel is illustrated in FIG. 22. In FIG. 22 the values without subscripts represent original existing panchromatic values and the values with subscripts represent interpolated panchromatic values. Additionally, FIG. 22 is a region of pixels used by low resolution panchromatic image creation block 206 (FIG. 2) to produce the region of pixels illustrated in FIG. 9. The following expressions are used in the preferred embodiment to produce the pixel values in FIG. 9.

$P_1'=k(P_{11}+P_{12}+P_{21}+P_{22})$ $P_2'=k(P_{13}+P_{14}+P_{23}+P_{24})$ $P_3'=k(P_{31}+P_{32}+P_{41}+P_{42})$ $P_4'=k(P_{33}+P_{34}+P_{43}+P_{44})$

In these expression k is a scale factor to produce the desired pixel value range of the output values. Typically, k is one-fourth to produce an average pixel value.

FIG. 18 is a region of pixels created from the high resolution color differences creation block 210 (FIG. 2). In FIG. 18, $X_1$ and $X_5$ represent existing color difference values in the low resolution color differences image created by block 208 (FIG. 2). Interpolated color difference values $X_2$, $X_3$, and $X_4$ are computed in block 210 (FIG. 2) with the following expressions:

$X_2=(3X_1+X_5)/4$ $X_3=(X_1+X_5)/2$ $X_4=(X_1+3X_5)/4$

As is standard practice for bilinear interpolation, this operation is first performed on each row to triple the amount of color difference values in each row. The computation is then repeated in the vertical direction on each column to triple the amount of color difference values in each column. The output of block 210 is sent to the high resolution full color image creation block 212.

The interpolation algorithm disclosed in the preferred embodiment(s) of the present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or scanned output), mobile devices (e.g., PDA or cell phone that can be used as a processing unit, a display unit, or a unit to give processing instructions), and as a service offered via the World Wide Web.

In each case, the interpolation algorithm can stand alone or can be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithm itself can be fully automatic, can have user input (be fully or partially manual), can have user or operator review to accept/reject the result, or can be assisted by metadata (metadata that can be user supplied, supplied by a measuring device (e.g. in a camera), or determined by an algorithm). Moreover, the algorithm can interface with a variety of workflow user interface schemes.

The interpolation algorithm disclosed herein in accordance with the invention can have interior components that utilize various data detection and reduction techniques (e.g., face detection, eye detection, skin detection, flash detection)

The invention has been described in detail with particular reference to certain preferred embodiments thereof, but it will be understood that variations and modifications can be effected within the spirit and scope of the invention.

PARTS LIST

110 Computer System
112 Microprocessor-based Unit
114 Display
116 Keyboard
118 Mouse
120 Selector on Display
122 Disk Drive Unit
124 Compact Disk-read Only Memory (CD-ROM)
126 Floppy Disk
127 Network Connection
128 Printer
130 Personal Computer Card (PC card)
132 PC Card Reader
134 Digital Camera
136 Camera Docking Port
138 Cable Connection
140 Wireless Connection
200 RGBP CFA Image
202 Low Resolution RGB CFA Image Creation
204 High Resolution Panchromatic Image Creation
206 Low Resolution Panchromatic Image Creation
208 Low Resolution Color Differences Creation
210 High Resolution Color Differences Creation
212 High Resolution Full Color Image Creation
214 High Resolution Full Color Image
216 Low Resolution Color Differences Image Interpolation
300 Pixel Neighborhood Predictor Computation
302 Pixel Neighborhood Classifier Computation
304 Direction of Computation Determination
306 High Resolution Panchromatic Pixel Value Computation

The invention claimed is:

1. A method for forming a final digital color image, comprising:
   (a) capturing an image using an image sensor having panchromatic pixels (P) and color pixels, red (R), green (G), and blue (B), in the following arrangement:

|   |   |
   |---|---|
   | R | G |
   | P | P |
   | P | P |
   | G | B |
   | P | P |
   | P | P; |

(b) providing from the captured image a digital high resolution panchromatic image, a low resolution panchromatic image, and a low resolution RGB CFA image;
   (c) using the low resolution panchromatic image and the low resolution RGB CFA image to produce a low resolution color differences image;
   (d) using the low resolution color difference image to produce a digital interpolated low resolution color differences image;
   (e) using the digital interpolated low resolution color differences image to produce a digital high resolution color differences image; and
   (f) using the digital high resolution panchromatic image and the digital high resolution color differences image to produce the final digital high resolution full color image.

2. The method of claim 1, wherein step (b) includes using pixel neighborhood predictor values responsive to pixel neighborhood classifier values to produce the digital high resolution panchromatic image.

3. The method of claim 1, wherein step (b) further includes averaging and subsampling the digital high resolution panchromatic image to produce the low resolution panchromatic image.

4. The method of claim 1, wherein step (b) further includes summing or averaging and subsampling a digital RGBP CFA image to produce the low resolution RGB CFA image.

5. A method for forming a final digital color image, comprising:
   (a) capturing an image using an image sensor having panchromatic pixels (P) and color pixels, red (R), green (G), and blue (B), in the following arrangement:

|   |   |   |   |   |   |
   |---|---|---|---|---|---|
   | R | R | R | G | G | G |
   | P | P | P | P | P | P |
   | P | P | P | P | P | P |
   | G | G | G | B | B | B |
   | P | P | P | P | P | P |
   | P | P | P | P | P | P; |

(b) providing from the captured image a digital high resolution panchromatic image, a low resolution panchromatic image, and a low resolution RGB CFA image;
   (c) using the low resolution panchromatic image and the low resolution RGB CFA image to produce a low resolution color differences image;
   (d) using the low resolution color difference image to produce a digital interpolated low resolution color differences image;
   (e) using the digital interpolated low resolution color differences image to produce a digital high resolution color differences image; and
   (f) using the digital high resolution panchromatic image and the digital high resolution color differences image to produce the final digital high resolution full color image.

6. The method of claim 5, wherein step (b) includes using pixel neighborhood predictor values responsive to pixel neighborhood classifier values to produce the digital high resolution panchromatic image.

7. The method of claim 5, wherein step (b) further includes averaging and subsampling the digital high resolution panchromatic image to produce the low resolution panchromatic image.

8. The method of claim 5, wherein step (b) further includes summing or averaging and subsampling a digital RGBP CFA image to produce the low resolution RGB CFA image.

9. A method for forming a final digital color image, comprising:

(a) capturing an image using an image sensor having panchromatic pixels (P) and color pixels, red (R), green (G), and blue (B), in the following arrangement:

```
R R R R G G G G
P P P P P P P P
R R R R G G G G
P P P P P P P P
G G G G B B B B
P P P P P P P P
G G G G B B B B
P P P P P P P P;
```

(b) providing from the captured image a digital high resolution panchromatic image, a low resolution panchromatic image, and a low resolution RGB CFA image;

(c) using the low resolution panchromatic image and the low resolution RGB CFA image to produce a low resolution color differences image;

(d) using the low resolution color difference image to produce a digital interpolated low resolution color differences image;

(e) using the digital interpolated low resolution color differences image to produce a digital high resolution color differences image; and (f) using the digital high resolution panchromatic image and the digital high resolution color differences image to produce the final digital high resolution full color image.

10. The method of claim 9, wherein step (b) includes using pixel neighborhood predictor values responsive to pixel neighborhood classifier values to produce the digital high resolution panchromatic image.

11. The method of claim 9, wherein step (b) further includes averaging and subsampling the digital high resolution panchromatic image to produce the low resolution panchromatic image.

12. The method of claim 9, wherein step (b) further includes summing or averaging and subsampling a digital RGBP CFA image to produce the low resolution RGB CFA image.

13. A method for forming a final digital color image, comprising:

(a) capturing an image using an image sensor having panchromatic pixels (P) and color pixels, red (R), green (G), and blue (B), in the following arrangement:

```
R P R P G P G P
P P P P P P P P
R P R P G P G P
P P P P P P P P
G P G P B P B P
P P P P P P P P
G P G P B P B P
P P P P P P P P;
```

(b) providing from the captured image a digital high resolution panchromatic image, a low resolution panchromatic image, and a low resolution RGB CFA image;

(c) using the low resolution panchromatic image and the low resolution RGB CFA image to produce a low resolution color differences image;

(d) using the low resolution color difference image to produce a digital interpolated low resolution color differences image;

(e) using the digital interpolated low resolution color differences image to produce a digital high resolution color differences image; and (f) using the digital high resolution panchromatic image and the digital high resolution color differences image to produce the final digital high resolution full color image.

14. The method of claim 13, wherein step (b) includes using pixel neighborhood predictor values responsive to pixel neighborhood classifier values to produce the digital high resolution panchromatic image.

15. The method of claim 13, wherein step (b) further includes averaging and subsampling the digital high resolution panchromatic image to produce the low resolution panchromatic image.

16. The method of claim 13, wherein step (b) further includes summing or averaging and subsampling a digital RGBP CFA image to produce the low resolution RGB CFA image.

* * * * *